United States Patent Office

3,843,442
Patented Oct. 22, 1974

---

3,843,442
IMMOBILIZED GLUCOSE ISOMERASE
Gerard J. Moskowitz, Buffalo Grove, Ill., assignor to Baxter Laboratories Inc., Morton Grove, Ill.
No Drawing. Filed Feb. 15, 1973, Ser. No. 332,937
Int. Cl. C12b 1/00
U.S. Cl. 195—31 F    10 Claims

ABSTRACT OF THE DISCLOSURE

Immobolized glucose isomerase is prepared by reacting whole microbial cells containing glucose isomerase with a diazotized aromatic primary diamino compound.

---

This invention relates to a glucose isomerase enzyme and, more particularly to an immobilized whole cell preparation of glucose isomerase.

Glucose isomerase is an enzyme or enzyme preparation which catalyzes the conversion of D-glucose to D-fructose. The glucose and fructose compounds involved in this conversion reaction are closely related monosaccharides, glucose having the hexose structure and fructose being in the ketohexose form. These simple sugars occur naturally and are found both in the free state and in the bound form in plants and animals. They find wide use as sweeteners in confectionaries, culinary mixes and other food products.

Commercially, most glucose is produced by the hydrolysis of corn starch. Although fructose can be prepared from sucrose by enzymic conversion, it is more economically attractive to produce fructose from glucose. In the production of certain invert type corn syrup products, a portion of the glucose is normally converted to fructose. The importance of this convention of glucose to fructose in corn syrup production lies in the fact that fructose not only is substantially sweeter than glucose, but also is very hygroscopic and difficult to crystallize. Therefore, a convenient means for increasing the conversion of glucose to fructose would find much use in commercial practice for the production of corn syrup.

The enzyme glucose isomerase has been reported to be produced by numerous micro-organisms. Some of these micro-organisms are, for example, *Aerobacter aerogenes, A. cloacae, Bacillus coagulans, B. megaterium, Brevibacterium pentoamino-acidicum, Escherichia intermedia, Lactobacillus brevis, L. fermenti, L. gayonii, L. lycopersici, L. mannitopoeus, L. pentoaceticus, Leuconostoc mesenteroides, Paracolobactrum aerogenoides, Psuedomonas hydrophilia, Streptomyces achromogenus, S. albus, S. bobiliae, S. echinatur, S. flavovirens, S. olivaceus, S. olivochromogenes, S. phaeochromogenes, S. rubiginosus, S. venezuelae,* and *S. wedmorensis.*

Glucose isomerase is essentially an intracellular enzyme. That is, the enzyme is found primarily within the microorganism cell or tightly adherent thereto. Therefore, the enzyme usually must either be released from the cell by breaking the cellular structure or the entire cell must be used as the enzyme source. Although the former process can be carried out to produce an extracellular enzyme such as by distintegration of the cell with a sonic or supersonic disintegrater, this additional procedure is time consuming and frequently difficult to perform on a practical scale.

The primary problem with using whole cells in the isomerization reaction is that the enzyme preparation tends to be unstable during multiple conversions and therefore cannot be used economically for recycling. Moreover, when live whole cells are used, undesirable side reactions occur during the isomerization due to other enzymatic material present, whereby products other than fructose are produced.

In accordance with the present invention, the foregoing disadvantages of the prior art glucose isomerase enzymes and enzyme preparations are overcome by covalently linking the enzyme to the cellular structures and other cell components within the cell itself. Whole cells are incubated with a cross linking reagent that has at least two diazo functional groups. The cross linking reagent comprises a diazotized aromatic primary diamino compound. The resultant enzyme product is a stable, water-insoluble immobilized enzyme preparation which is useful for multiple glucose conversions in which no active enzyme, diazo group or fluorescent material is detected in the converted syrup after removal of the immobilized enzyme preparation by filtration or centrifugation.

The preparation of immobilized enzymes in general is well known. However, most of these processes require contact of a highly purified enzyme with a water-insoluble support, bearing groups capable of covalently or ionically reacting with the enzyme or with adsorbing the enzyme. By using the whole cell as a vehicle for covalent attachment of the glucose isomerase enzyme in accordance with the present invention, a considerable advantage is attained by avoiding the various enzyme purification processing steps required heretofore.

While purified, soluble enzymes have been coupled to whole cells heretofore by incubating the enzyme and microbial cells in solutions of salts of heavy metals, these prior preparations have the disadvantage in that the salts used are toxic. Moreover, these preparations are insufficiently stable to allow for a significant number of re-utilizations of the same enzyme preparation due to the fact that the enzyme is readily leached from the cell wall into the surrounding solution.

Thus, the present invention provides an immobilized glucose isomerase enzyme composition which is highly stable and can be recycled in numerous glucose conversion reactions without substantial loss of enzyme activity. The need for any substantial purification of the crude enzyme preparation before immobilization is eliminated and the immobilized enzyme is readily removable from the corn syrup reaction mixture after the glucose conversion.

The cross linking reagent employed in this invention is a diazotized primary diamino compound which can contain, for example, a benzene, benzidine, pyridine, pyrimidine, purine, acridine, thiazole, oxazole, benzothiophene, cumarone, phenothiazine, or phenoxazine ring structure, and, preferably, is a diazotized heterocyclic primary diamino compound having from one to three rings.

The preferred cross linking reagents are diazotized 2,6-diaminopyridine; 2,4-diamino-6-hydroxypyrimidine; 3,6-diaminoacridine; acriflavine; and other diazotized compounds containing a pyridine, pyrimidine, or acridine moiety.

The diazotization of the foregoing primary amines can be carried out by reaction with nitrous acid and HCl to give the diazonium salt, for example,

$$Ar(NH_2)_2 + 2HCl + 2HNO_2 \rightarrow Ar(N_2Cl)_2 + 4H_2O$$

Ar=for example, pyridine, pyrimidine, or acridine aryl moiety.

Alkali metal nitrite such as sodium nitrite can be used in place of the nitrous acid in the foregoing reaction with equivalent results.

The method of the present invention can be carried out with wet living microbial cells freshly isolated from the fermentor, with solvent dried cells such as acetone- or methanol-dried cells, or with a heterogeneous mixture of proteins such as occurs in the fermentation culture.

The covalent linking of the enzyme to the cellular structure and other cell components is carried out by incubation of the whole cells with the cross linking reagent, preferably at a temperature of from about 0° C. to about 25° C. for about one to about 100 hours. Incubation at about 4° C. for about 48 hours is optimum.

Although the glucose isomerase enzyme or enzyme preparation can be obtained from numerous microorganisms, as noted above, for purposes of this invention it is preferable to obtain the enzyme or enzyme preparation from streptomyces and lactobacillus species, for example, *Streptomyces phaeochromogenes* and *Lactobacillus brevis*. These microorganisms are well known, the Streptomyces being members of the order Actinomycetales and Lactobacillus belonging to the order Eubacterialas. In particular, *Streptomyces phaeochromogenes* is isolated from soil and described by Conn (*Actinomyces phaechromogenus* (sic), "N.Y. State Agr. Exp. Sta. Tech. Bull. No. 60," 1917, and by Waksman and Henrici [*Streptomyces phaechromogenus* (sic)] in Bergey's Manual, 6th ed. 1948, at p. 943. *Lactobacillus brevis* is widely distributed in nature, particularly in plant and animal products, but also in soils, and is described by Orla-Jensen (*Betabacterium breve*). "The Lactic Acid Bacteria," 1919, at p. 175, and in Bergey's Manual, 4th ed., 1934, at p. 312.

The preparation of glucose isomerase from (1) Streptomyces species and from (2) lactic acid bacteria also is well known and is described, respectively, by (1) Takasaki, *Agr. Biol. Chem.*, Vol. 30, No. 12, pp. 1247–53 (1966), Vol. 31, No. 3, pp. 309–13 (1967), and (2) Yamanaka, *Agr. Biol. Chem.*, Vol. 25, No. 4, pp. 272–80 (1961), Vol. 27, No. 4, pp. 271–78 (1963).

Although most Streptomyces species are D-xylose utilizing organisms, certain strains are known to produce glucose isomerase enzymes by assimilating xylan, which is much less expensive than D-xylose. It is even unnecessary to use pure xylan for the formation of glucose isomerase. Thus, crude materials such as wheat bran, corn cob and corn hull can be directly employed as a source of xylan.

Other suitable examples of *Streptomyces phaeochromogenes* employing xylose as the carbon source are described by Sato and Tsumura, *Agr. Biol. Chem.*, Vol. 29, No. 12, pp. 1129–34 (1965), Japan Patent 17,640 (1966). Enzymic conversion of D-glucose to D-fructose was demonstrated in the cell-free extracts of *Streptomyces phaeochromogenes* cultures grown on D-xylose. The organism has certain metal requirements; magnesium was found to be essential and cobalt was found to stimulate the reaction.

Still other specific examples of *Streptomyces phaeochromogenes* which can be employed to prepare the glucose isomerase enzyme employed in this invention are three strains on deposit with the Northern Regional Research Laboratories and available to the public under the NRRL code designations B–1131, B–1157 and B–3559. Suitable examples of the preparation of glucose isomerase from these strains is described by Strandberg, *Bacteriology Proceedings*, p. 18, A. 117 (1969); Strandberg and Smiley, *Appl. Microbial*, Vol. 4, No. 4, pp. 588–93 (1971). In these preparations, the enzyme was disrupted by sonic treatment and partially purified by ammonium sulfate fractionation, followed by dialysis and lyophilization. In accordance with the present invention, it is unnecessary to carry out the sonic treatment or partial purification.

The lactic acid bacteria and *Lactobacillus brevis*, in particular, also generally utilize xylose for the production of glucose isomerase. In these organisms, D-glucose isomerizing activity usually accompanies D-xylose isomerase production. Yamanaka, *Biochim. Biophys. Acta* 151, pp. 670–80 (1968). These organisms also are known to have certain metal ion requirements for production of glucose isomerase, notably $Co^{++}$ and $Mn^{++}$.

Another suitable example of *Lactobacillus brevis* is a strain available from the Institute of Fermentation, Osaka, Japan, designated 3960 and described by Yamanaka, *ibid*.

The preferred microorganism for use in the present invention is *Streptomyces phaeochromogenes*.

Yet other examples of suitable glucose isomerase-producing microorganisms are disclosed in U.S. Pats. 2,950,228; 3,616,221; 3,622,463; 3,623,953; 3,625,828; 3,645,848; 3,654,080, 3,666,628; and 3,689,362.

The following examples will further illustrate the invention although it will be understood that the invention is not limited to these specific examples. In these examples, the glucose isomerase-containing whole cells were obtained from the fermentation of *Streptomyces phaeochromogenes* in nutrient culture media containing an assimilable source of carbon and nitrogen with trace minerals and a xylan source under submerged aerobic conditions.

EXAMPLE 1

An immobilized whole cell preparation of glucose isomerase is produced as follows. All solutions are cooled to 0° C. unless otherwise stated.

1.5 grams of 3,6-diaminoacridine are dissolved in 235 ml. of normal HCl. After stirring the solution for five minutes at 0° C., 56 ml. of 0.5 molar $NaNO_2$ is added to effect the conversion of the primary amino groups to diazo groups. The mixture is stirred at 0° C. under vacuum for one hour. The pH is then adjusted to 8.5 with 6N NaOH and sufficient $CoCl_2$ is added to provide 0.001 M final concentration. Acetone-dried whole cells (3 grams) are suspended in 100 ml. of cold 0.1 M $Na_2CO_3$ solution containing 0.001 M $CoCl_2$. The pH is adjusted to 8.5 with HCl and then the cell mixture is added slowly with stirring to the above prepared diazoacridine and stirred at 4° C. for 18 hours.

The resulting precipitate of immobilized whole cells is isolated by centrifugation with a yield of 18% of the initial activity (prior to immobilizaton), washed three times with 300 ml. of water, and a portion used for glucose conversion by suspending in a reaction mixture containing 8 grams of glucose, 0.03 M tris-acetate [acetate of tris (hydroxymethyl) aminomethane], pH 8.0, 0.06 M $MgSO_4$ and 0.0006 M $CoCl_2$ in a final volume of 32 ml. The reaction mixture is incubated with shaking at 60° C. for 24 hours. The immobilized enzyme is then isolated by centrifugation and resuspended in a fresh reaction mixture and the entire conversion procedure is repeated several times for a total of thirteen conversions.

In the foregoing conversion procedure, a sample containing 3 ml. of 25% trichloroacetic acid is used as a zero time control. Untreated acetone-dried cells incubated in 0.1 M $Na_2CO_3$, pH 8.5, containing 0.001 M $CoCl_2$ are employed as a control sample for comparison.

In the conversion procedure, conditions are selected which do not achieve equilibrium in order to detect small changes in enzyme activity during recycling of the enzyme. Therefore, an amount of enzyme is selected to produce 25–30% conversion of glucose to fructose in the indicated time. A mixture of 42–45% fructose and 58–55% glucose is the equilibrium mixture for the enzyme.

The assay for the conversion is carried out substantially according to the method of Tsurmura and Sato, *Agr. Biol. Chem.*, Vol. 29, p. 1129 (1965) and the fructose is measured by the cystein-carbazole method of Dische and Borenfreund, *J. Biol. Chem.*, Vol. 192, p. 583 (1951). In this assay, enzyme is incubated for 30 minutes at 60° C. in a solution containing 1.0 M glucose, 0.1 M $MgSO_4$, and 0.001 M $CoCl_2$ in a final volume of 2.0 ml. A solution of 25% trichloroacetic acid (0.2 ml.) is added to stop the reaction and the fructose produced is then measured. In this assay, one unit is defined as the amount of enzyme required to produce one micromole of fructose in the reaction mixture.

The following table sets forth the degree of conversion obtained with the cross linked (immobilized) cells in comparison to the degree of conversion obtained with the untreated acetone-dried cells over thirteen conversion periods. Conversion number 1 is taken as the initial degree of conversion of the system and all subsequent conversions are expressed as a percentage thereof.

| Conversion number | 1 | 2 | 3 | 4 | 5 | 6 | 7 | 8 | 9 | 10 | 11 | 12 | 13 |
|---|---|---|---|---|---|---|---|---|---|---|---|---|---|
| Immobilized cells, degree of conversion per cycle | 100 | 104 | 113 | 100 | 109 | 74 | 78 | 74 | 61 | 44 | 48 | 44 | 30 |
| Untreated cells, degree of conversion per cycle | 100 | [1]13 | | | | | | | | | | | |

[1] Discontinued after two conversions.

From the above results it can be seen that the immobilized cells showed a marked increase in stalbility as compared to that of the untreated cells. The untreated cells lost the greater part of their activity in the second conversion, whereas the immobilized cells retained their full activity throughout five conversions, and even after thirteen conversions their activity was still more than double that of the untreated cells after only two conversions.

EXAMPLE 2

Example 1 was repeated with fresh wet cells previously isolated from a fermentation mash and washed three times with water. The cells (15.2 grams) were incubated with three grams of 3,6-diaminoacridine previously diazotized as in the procedure of Example 1. After stirring at 4° C. for 48 hours, the immobilized cells were isolated by centrifugation with a yield of 63% of the initial activity. The immobilzed cells were washed and an aliquot thereof was suspended in the reaction mixture and assayed as in Example 1 for the conversion of glucose to fructose. Controls were similarly prepared and tested as in Example 1.

The following table sets forth the degree of conversion obtained with the immobilized cells in comparison with the untreated acetone-dried cells over twenty conversion periods.

| Conversion number | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Immobilized cells, degree of conversion per cycle | 100 | 110 | 107 | 107 | 100 | 97 | 90 | 83 | 76 | 83 | 72 | 59 | 69 | 83 | 86 | 97 | 83 | 59 | 48 | 48 |
| Untreated cells, degree of conversion per cycle | 100 | 100 | 17 | 10 | 7 | [1]7 | | | | | | | | | | | | | | |

[1] Discontinued after six conversions.

The foregoing tabulated results show the outstanding stability of the immobilized enzyme of the present invention through as many as twenty conversions, after which time it still retained nearly 50% of the activity prior to the first cycle.

EXAMPLE 3

The compound 2,4-diamino-6-hydroxypyrimidine, $H_2O$ (1.5 grams) was diazotized in a manner analogous to the diazotization of 3,6-diaminoacridine in Example 1. The resulting product was contacted with acetone-dried whole cells as in Example 1 and the reaction mixture was stirred for 18 hours at 4° C. The resulting immobilized cells were isolated in a yield of 26% of the initial enzyme activity. The immobilized cells were used for glucose conversion as in Example 1.

The following table sets forth the degree of conversion (expressed as a percent of the initial conversion) obtained with the immobilized cells over nine conversion cycles.

| Conversion number | 1 | 2 | 3 | 4 | 5 | 6 | 7 | 8 | 9 |
|---|---|---|---|---|---|---|---|---|---|
| Immobilized cells, degree of conversion per cycle | 100 | 90 | 59 | 67 | 57 | 39 | 28 | 31 | 23 |

EXAMPLE 4

The compound 2,6-diaminopyridine (1.5 grams) was diazotized and then reacted with enzyme bearing cells in the manner of Example 1. The immobilized cells were isolated with a yield of 15% of the initial enzyme activity. The immobilized cells were then used for glucose conversion as in Example 1 and the degree of conversion obtained over five cycles is set forth in the following table.

| Conversion number | 1 | 2 | 3 | 4 | 5 |
|---|---|---|---|---|---|
| Immobilized cells, degree of conversion per cycle | 100 | 50 | 36 | 32 | 27 |

EXAMPLE 5

Various concentrations ranging from 0.5 to 6.0 grams of diazotized 3,6-diaminoacridine per 10 grams of wet isomerase-containing whole cells were used to prepare immobilized whole cells by incubation of the mixture at 4° C. with stirring for 47–48 hours. The resulting immobilized enzyme preparations were isolated by centrifugation, washed and assayed as in Example 1. The yields of initial enzyme activity ranged from 60% to 84%.

The immobilized enzyme products were tested for their stability to multiple glucose conversions in solution containing 2.0 grams glucose, 0.045 molar tris-acetate buffer, pH 8.0, 0.091 molar $MgSO_4$ and 0.00091 molar $CoCl_2$ brought to a final volume of 22 ml. In these conversions, the sample which employed 6.0 grams of the cross linking agent per 10 grams of whole cells maintained better than 50% of its original conversion up to ten conversions. Similarly, the samples which employed 0.5 grams and 4.0 grams of the cross linking agent maintained better than 50% of the original conversion up to eleven conversions and the samples employing 1.0 and 2.0 grams of the cross linking agent maintained that level of conversion up to fourteen conversions. By way of comparison, untreated cells lost 67% of their original level of conversion by the third cycle.

EXAMPLE 6

Wet living cells (15 grams) were treated with acriflavine (3,6-diamino-10-methylacridinium chloride) (3.72 grams), diazotized in a manner substantially similar to that used for 3,6-diaminoacridine in Example 1, by incubation at 4° C. for 47 hours. The resulting immobilized cells were isolated by centrifugation, washed twice with water, and then tested for stability to multiple glucose conversions in a solution containing 4.0 grams of glucose, 0.025 M tris-acetate buffer, pH 8.0, 0.05 M $MgSO_4$ and 0.0005 M $CoCl_2$.

The following table sets forth the degree of conversion obtained with the immobilized enzyme (treated cells) and the untreated controls in seven conversions.

| Conversion number | 1 | 2 | 3 | 4 | 5 | 6 | 7 |
|---|---|---|---|---|---|---|---|
| Immobilized cells, degree of conversion per cycle | 100 | 112 | 112 | 96 | 64 | 44 | 48 |
| Untreated cells, degree of conversion per cycle | 100 | 41 | [1]16 | | | | |

[1] Discontinued after three conversions.

EXAMPLE 7

Fresh, whole cells (280 grams) are suspended in 0.1 M $Na_2CO_3$ containing 0.001 M $CoCl_2$ at pH 8.5 and an aliquot containing 20 grams of cells (100 ml.) is stirred at room temperature for 4 hours.

The compound 3,6-diaminoacridine (24 grams) is dissolved in 1880 ml. of 2N HCl and cooled to 0° C. in a salt ice bath. Ice cold 1N $NaNO_2$ (446 ml.) is added and the mixture stirred at 0° C. under vacuum for one hour. An aqueous solution of $CoCl_2$ is added to a final concentration of 0.0017 M and the pH is adjusted to 8.5 with 10N NaOH.

The stirred cells (20 grams in 100 ml.) are then added slowly with stirring in the cold (0° C.) to an aliquot of the diazotized 3, 6-diaminoacridine containing 4 grams of the original 3, 6-diaminoacridine (452 ml.). The reaction mixture is stirred at 4° C. for 48 hours, at which time the resulting immobilized cells are isolated by centrifugation. The product was assayed according to the procedure in Example 1 and the yield was found to be 48%.

Samples containing from 50 to 300 units of enzyme activity were incubated in a solution containing 2.0–2.2 grams of glucose, 0.05 M tris-acetate buffer, pH 8.0, 0.1 M $MgSO_4$, 0.001 M $CoCl_2$ and water to a final volume of 22 ml. for 24, 48 and 72 hours at 60° C. in a shaking water bath. Samples containing 3 ml. of 25% trichloroacetic acid were used as zero time controls. At the foregoing designated times, the samples were removed from the water bath and the insoluble material was removed by filtration.

The concentration of fructose in the conversion product was determined according to the procedure described in Example 1. Glucose concentration was determined by the glucose oxidase, chromogen procedure described in "Technical Bulletin No. 9," Fermco Laboratories Division of G. D. Searle & Co., Method II, page 5, 1966, also reported in general by Martinek, *J. Amer. Medical Technologists,* Vol. 29, No. 3, 1967.

In this assay procedure, $$\text{Percent Fructose} = \frac{\text{Fructose}}{\text{Glucose} + \text{Fructose}},$$

and at equilibrium the reaction mixture contained 43% fructose and 57% glucose.

Other aromatic primary diamino compounds which can be diazotized and used for preparing an immobilized glucose isomerase enzyme composition in the manner of the foregoing examples in accordance with the invention herein defined are 3,5-diaminobenzoic acid, 3,3-diaminobenzidine tetrachloride dihydrate and 2,4 - diamino-5-phenylthiazole; and other microorganisms which can be used to obtain the glucose isomerase-containing whole cells for use in these examples are *Streptomyces bobiliae, S. albus, S. olivaceus* and *Lactobacillus brevis.*

Still other examples and modifications of the foregoing examples will be apparent to the person skilled in the art after reading the foregoing description and the appended claims without departing from the spirit and scope of the invention. All such further examples and modifications of these examples are included within the scope of the appended claims.

What is claimed is:

1. A process for the preparation of an immobilized glucose isomerase enzyme composition comprising reacting whole microbial cells containing glucose isomerase enzymes with a diazotized aromatic primary diamino compound.

2. The process of Claim 1 in which the aromatic primary diamino compound is selected from the group consisting of 2,6-diaminopyridine; 2,4-diamino-6-hydroxypyrimidine; 3,6-diaminoacridine; and acriflavine.

3. The process of Claim 1 in which the reaction is carried out at about 0° C. to about 25° C. for about one to about 100 hours.

4. The process of Claim 1 in which the whole microbial cells are obtained from the fermentation of *Streptomyces phaeochromogenes.*

5. An immobilized glucose isomerase enzyme composition comprising whole microbial cells containing glucose isomerase enzyme covalently linked to a diazotized aromatic primary diamino compound.

6. The composition of Claim 5 in which the aromatic primary diamino compound is selected from the group consisting of 2,6-diaminopyridine; 2,4-diamino-6-hydroxypyrimidine; 3,6-diaminoacridine; and acriflavine.

7. The composition of Claim 5 in which the whole microbial cells are obtained from the fermentation of *Streptomyces phaeochromogenes.*

8. In the process of converting D-glucose to D-fructose by a glucose isomerase enzyme, the improvement comprising employing as the enzyme the immobilized glucose isomerase enzyme composition of Claim 5.

9. In the process of converting D-glucose to D-fructose by a glucose isomerase enzyme, the improvement comprising employing as the enzyme the immobilized glucose isomerase enzyme composition of Claim 6.

10. In the process of converting D-glucose to D-fructose by a glucose isomerase enzyme, the improvement comprising employing as the enzyme the immobilized glucose isomerase enzyme composition of Claim 7.

References Cited
UNITED STATES PATENTS

| | | | |
|---|---|---|---|
| 3,706,633 | 12/1972 | Katchalski et al. | 195—68 |
| 3,753,858 | 8/1973 | Takasaki et al. | 195—65 |
| 3,694,314 | 9/1972 | Lloyd et al. | 195—65 X |

OTHER REFERENCES

Hough et al., Nature, Vol. 235, p. 389 (1972).

A. LOUIS MONACELL, Primary Examiner

T. G. WISEMAN, Assistant Examiner

U.S. Cl. X.R.

195—65, 68, Dig 11